(12) United States Patent
Srinivasan et al.

(10) Patent No.: US 11,487,938 B2
(45) Date of Patent: Nov. 1, 2022

(54) METHODS AND SYSTEMS FOR IMPROVING LANGUAGE PROCESSING FOR AMBIGUOUS INSTANCES

(71) Applicant: INTERNATIONAL BUSINESS MACHINES CORPORATION, Armonk, NY (US)

(72) Inventors: Ramesh G Srinivasan, Bengaluru (IN); Samir Katti, Bangalore (IN); Mohan Nagraj Dani, Bangalore (IN); Harshavardhan Changappa, Bangalore (IN); Raviprasad Pentakota, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 203 days.

(21) Appl. No.: 16/743,829

(22) Filed: Jan. 15, 2020

(65) Prior Publication Data
US 2021/0216707 A1    Jul. 15, 2021

(51) Int. Cl.
| G06F 40/247 | (2020.01) |
| G06K 9/62 | (2022.01) |
| G06F 40/35 | (2020.01) |
| G06F 40/289 | (2020.01) |

(52) U.S. Cl.
CPC .......... *G06F 40/247* (2020.01); *G06F 40/289* (2020.01); *G06F 40/35* (2020.01); *G06K 9/6223* (2013.01)

(58) Field of Classification Search
None
See application file for complete search history.

(56) References Cited

U.S. PATENT DOCUMENTS

| 6,260,008 B1* | 7/2001 | Sanfilippo | G06F 40/253 715/256 |
| 7,925,498 B1* | 4/2011 | Baker | G06F 16/3338 704/9 |
| 2001/0014902 A1* | 8/2001 | Hu | G06F 40/49 715/236 |
| 2001/0056445 A1* | 12/2001 | Meystel | G06F 40/35 715/234 |

(Continued)

FOREIGN PATENT DOCUMENTS

CN    109086269 A    12/2018

OTHER PUBLICATIONS

Rosso, Paolo, Edgardo Ferretti, Daniel Jiménez, and Vicente Vidal. "Text categorization and information retrieval using wordnet senses." In The Second Global Wordnet Conference GWC, pp. 299-304. 2004. (Year: 2004).*

(Continued)

*Primary Examiner* — Frank D Mills
(74) *Attorney, Agent, or Firm* — Griffiths & Seaton PLLC

(57) ABSTRACT

Embodiments for analyzing language content are provided. An ambiguous sentence is identified. A first word and a second word within the ambiguous sentence are selected. At least one synonym outlier for the first word and at least one synonym outlier for the second word are determined. A phrase is generated utilizing the at least one synonym outlier for the first word and the at least one synonym outlier for the second word. A context for the ambiguous sentence is determined based on the generated phrase.

21 Claims, 7 Drawing Sheets

(56) References Cited

U.S. PATENT DOCUMENTS

| | | |
|---|---|---|
| 2015/0339290 A1 | 11/2015 | Mueller et al. |
| 2015/0348565 A1 | 12/2015 | Rhoten et al. |
| 2017/0286399 A1* | 10/2017 | Popescu .................. G06F 40/30 |
| 2017/0351661 A1 | 12/2017 | Lasser |

OTHER PUBLICATIONS

Asiimwe, Stella, Susan Craw, Nirmalie Wiratunga, and Bruce Taylor. "Automatic Text Standardisation by Synonym Mapping." BCS Specialist Group on Artificial Intelligence Expert Update, vol. 10, pp. 9-17, 2010. (Year: 2010).*

Banerjee, Satanjeev, and Ted Pedersen. "An adapted Lesk algorithm for word sense disambiguation using WordNet." In International conference on intelligent text processing and computational linguistics, pp. 136-145. Springer, Berlin, Heidelberg, 2002. (Year: 2002).*

Barmawi, Ari Moesriami, and Ali Muhammad. "Paraphrasing Method Based on Contextual Synonym Substitution." Journal of ICT Research and Applications 13 (2019): 257-282. (Year: 2019).*

\* cited by examiner

METHODS AND SYSTEMS FOR IMPROVING LANGUAGE PROCESSING FOR AMBIGUOUS INSTANCES

BACKGROUND OF THE INVENTION

Field of the Invention

The present invention relates in general to computing systems, and more particularly, to various embodiments for improving language processing for ambiguous instances.

Description of the Related Art

Natural language processing (NLP) and natural language understanding (NLU) are subfields of linguistics, computer science, information engineering, and artificial intelligence concerned with the interactions between computers and human (or natural, spoken, etc.) languages. In particular, NLP and NLU deal with how to program computers to process, analyze, and understand (or comprehend) natural language data.

When NLU and/or NLP are applied to natural language, if the particular context of a communication (or content) is not known and/or if the communication includes a pun, idiom, etc., ambiguity and/or confusion may result. For example, in the English language, the term "yard" usually refers to a unit of measurement. However, in the financial domain (e.g., the foreign exchange market), the same term often refers to one billion units. If a communication that includes such a term is processed via NLP and/or NLU, appropriate results may not be achieved (i.e., particularly if the context of the communication is not known). Although domain-specific ontologies may be useful in addressing this issue, generating such is a very challenging and time-consuming task, as it requires extracting domain-specific terms from a corpus (or collection of documents related to a particular domain) and assign relevant domain concepts to each.

SUMMARY OF THE INVENTION

Various embodiments for analyzing language content are provided. An ambiguous sentence is identified. A first word and a second word within the ambiguous sentence are selected. At least one synonym outlier for the first word and at least one synonym outlier for the second word are determined. A phrase is generated utilizing the at least one synonym outlier for the first word and the at least one synonym outlier for the second word. A context for the ambiguous sentence is determined based on the generated phrase.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
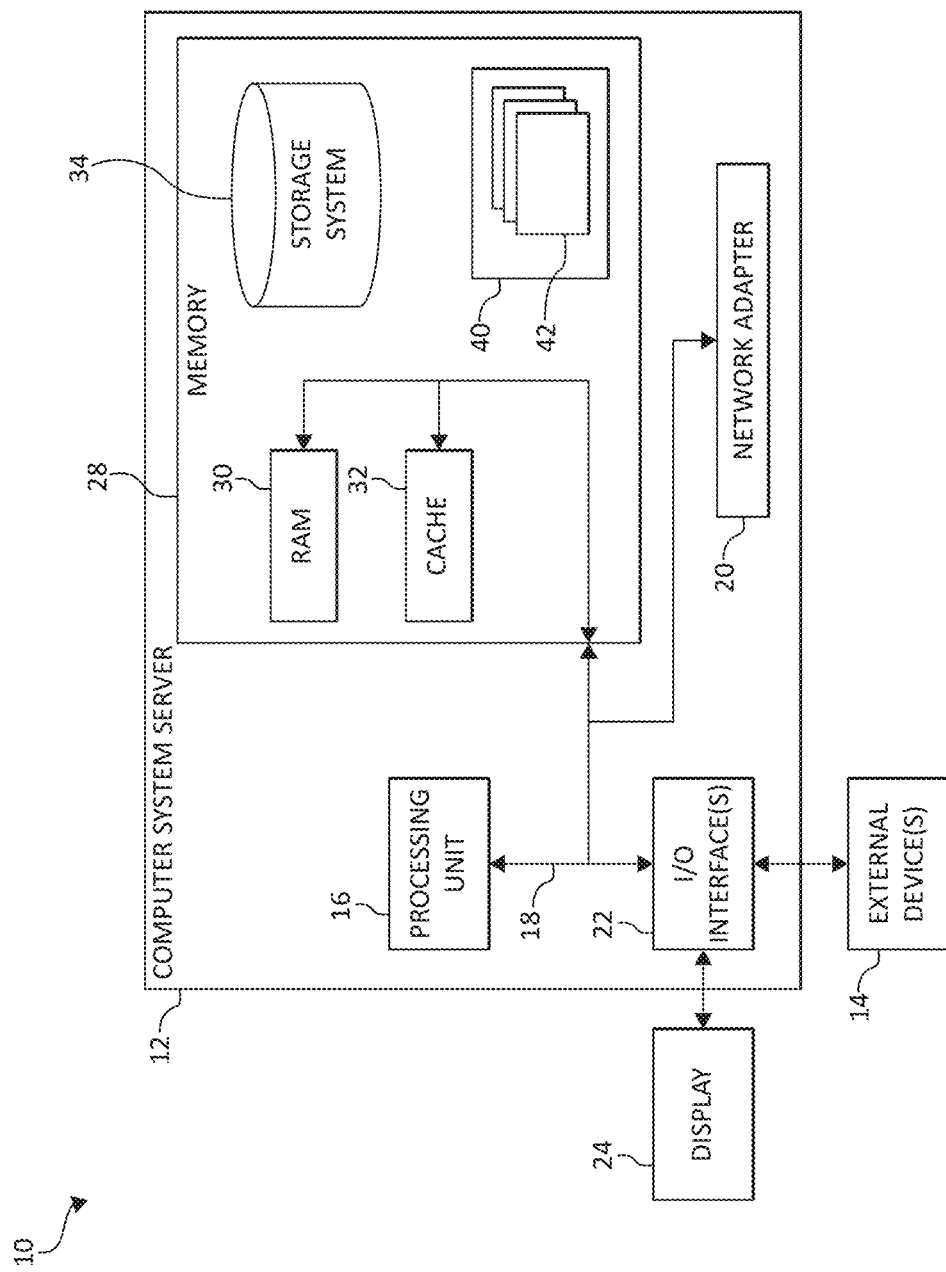
FIG. 1 is a block diagram depicting an exemplary computing node according to an embodiment of the present invention.

As discussed above, natural language processing (NLP) and natural language understanding (NLU) are subfields of linguistics, computer science, information engineering, and artificial intelligence concerned with the interactions between computers and human (or natural, spoken, etc.) languages. In particular, NLP and NLU deal with how to program computers to process, analyze, and understand (or comprehend) natural language data. When NLU and/or NLP are applied to natural language, if the particular context of a communication (or content) is not known and/or if the communication includes a pun, idiom, etc., ambiguity and/or confusion may result.

For example, in the English language, the term "yard" usually refers to a unit of measurement. However, in the financial domain (e.g., the foreign exchange market), the same term often refers to one billion units. More specifically, consider two sentences: "I bought a land of 10 yards." and "I did a deal for 10 yards." In the first sentence, the word "yard" is related to the common or "base-language" understanding of the term, while in the second sentence, the use of the term is related to the foreign exchange market (i.e., within the financial domain).

If a communication that includes such a term is processed via NLP and/or NLU, appropriate results may not be achieved (i.e., particularly if the context of the communication is not known). Although domain-specific ontologies may be useful in addressing this issue, generating such is a very challenging and time-consuming task, as it requires extracting domain-specific terms from a corpus (or collection of documents related to a particular domain) and assign relevant domain concepts to each.

As such, current language analysis techniques (e.g., NLP, NLU, etc.) have limited ability with respect to understanding context in a domain-specific example. As a specific example, when applied to the sentences referred to above (e.g., utilizing the word "yard"), current techniques may have difficulty in recognizing and/or differentiating the different contexts (e.g., the context of measurement/distance in the first sentence and the context of finance in the second sentence).

To address these needs and/or the shortcomings in the prior art, in some embodiments described herein, methods and/or systems are disclosed that, for example, identify how to apply domain specific rules to given constructs of natural language content (e.g., in the English natural language). That is, the methods and systems described herein are useful when analyzing content with one or more words that may have different meanings in different contexts. In some embodiments, the methods (and/or systems) propose the most appropriate synonym(s) (and/or outliers) for ambiguous words (or phrases, etc.) across all appropriate contexts and selects (or generates) one or more context for the content and/or ambiguous words.

In some embodiments, the methods (and/or systems) described herein include (and/or utilize) a tokenization process, a "bag of words" analysis, a clustering method, and mathematical computation, perhaps among other processes.

In some embodiments, a document (or content, communication, etc.) is received (or retrieved, etc.). If appropriate, the document is divided (or parsed, "tokenized," broken down, etc.) into separate paragraphs, each of which is then divided into sentences (or phrases, etc.). Each sentence is then analyzed to determine whether or not it is ambiguous or includes any ambiguous words (or terms, etc.). As will be appreciated by one skilled in the art, the determination of ambiguity (e.g., with respect to NLP, NLU, etc.) may be based on whether or not different meanings, interpretations, and/or definitions may be identified based on the context (e.g., a word may have one meaning in a first context/domain and another meaning in a second context/domain).

In some embodiments, synonyms (and/or outliers or synonym outliers) for each of the ambiguous words (e.g., two ambiguous words) are then identified (or determined, etc.) The parts of speech for the ambiguous words are determined (or extracted) along with "noun-verb phrases" within the sentence(s). In other words, after the sentence(s) are parsed into different parts of speech, noun phrases and/or verb phrases may be identified. In some embodiments, "noun-verb phrases" may be considered to be combinations of one or more noun phrase and one or more verb phrase that when appearing in conjunction may be utilized to arrive at the "subject" of the sentence(s). For example, a noun (or noun phrase) and a verb (or verb phrase) may jointly describe the subject (e.g., an individual) and any related actions (e.g., the individual's actions), which may provide a distinct context for the subject. In turn, such may be utilized to determine additional information (or context) related to the subject (e.g., additional context for the individual), thus leading to multiple points, providing the ability to derive additional subjects for iteration to additional meanings.

Different combinations of the synonyms (or outliers) are then combined to determine if any unique or distinct noun-verb phrases may be formed (e.g., unique or distinct within one or more subject domains). In some embodiments, a particular methodology is utilized to "merge" a noun's action(s) and its associated word(s) or phrase(s) and determine distinct noun-verb phrases (e.g., which provides the subject of the sentence or paragraph within the document). Additional details concerning noun-verb phrases and/or unique/distinct noun-verb phrases are provided below.

A subject matter repository (or any suitable database) is then utilized to determine the subject(s) (and/or domain(s), context(s), etc.) in which the distinct noun-verb phrase(s) occur (if any). After the subject is identified, the meanings of the words (e.g., the ambiguous words and/or the words of the distinct noun-verb phrase(s)) within the subject are checked. The determine subject(s) (and/or context(s), etc.) may then be utilized for further processing (e.g., by NLP, NLU, etc.).

More particularly, in some embodiments, after a document is received (or identified, retrieved, etc.), the document is tokenized into paragraphs. The paragraphs are then tokenized into sentences using sentence tokenizer. Applying NLU (as an example), the sentence (e.g., each sentence) is then analyzed to see if there is any ambiguity. The sentence is then converted into parts of speech. After the extraction into parts of speech, the words are analyzed to look for noun-verb phrases. The text data may then be converted into an appropriate form for processing via machine learning (or a cognitive analysis, etc.). In some embodiments, the "bag-of-words" model (or algorithm, processing, etc.) is utilized. As will be appreciated by one skilled in the art, the bag-of-words model provides a way to extract features from text for use in machine learning algorithms, which is relatively simple to understand and implement.

In some embodiments, a clustering method (or technique) is then applied to learn about the distribution of the data. In some embodiments, a k-nearest neighbors (k-NN) algorithm (or method) is utilized. However, as other examples, k-means clustering may also be utilized, as may Word2vec models, as are commonly understood. The clustering method may be utilized to generate a list of synonyms and a list of outliers (or synonym outliers) for the ambiguous words. The synonym list may include the "closest" matches for the tokenized sentence. The outliers may be (or include) words that do not "intuitively" identify the context and are "farthest" from the particular word (i.e., the definition thereof), subject, or context. That is, "farther" words have less similarity to the particular word being evaluated. As such, if a set of such words appear in a sentence, it may be assumed that there may be additional meanings (or contexts) for the sentence. Thus, in some embodiments, outliers (or relatively unrelated words) are utilized for further processing as described below.

In some embodiments, the synonyms (and/or outliers) for the ambiguous words (e.g., two words) are compared to determine if they may be used to form any (unique/distinct) noun-verb phrases. This may be performed in a "Venn diagram-like" manner with, for example, each "circle" (or group) representing one the ambiguous words and including its synonyms (e.g., one circle/group for a noun and one circle/group for a verb). The noun-verb phrase(s) may be formed (if possible) by, for example, identifying a word from each group that may be considered both a noun and a verb. That is, the noun-verb phrase(s) may be formed by words that are determined to be in the "overlapping" or "intersecting" portions of the Venn diagram circles (or groups). A subject matter repository may then be searched to determine if there are any subjects, contexts, etc. in which the noun-verb phrases appears, are (commonly) used, etc. The determined subject(s) may then be utilized for further processing.

It should be noted that the methods and systems described herein differ from supervised, unsupervised, and semantics learning methods. In contrast to word sense disambiguation (WSD), embodiments described herein determine disambiguation of the words, but also arrives at a decision (e.g., with respect to context), even if the content (e.g., sentence, phrase, etc.) is a pun, idiom, etc. For example, one example utilized for WSD is following passage: "Little John was looking for his toy box. Finally he found it. The box was in the pen. John was very happy." The sense (or context) inventory typically utilized in WSD (i.e., WordNet), includes five senses (or contexts, definitions, etc.) for the word "pen" (i.e., a writing instrument, an enclosure for livestock, an enclosure for children, a correctional institute, and a female swan), which are selected from to determine the meaning of the exemplary passage (e.g., in WSD).

Supervised methods are based on the assumption that the context can provide enough evidence on its own to disambiguate words. New knowledge is a problem (or "bottleneck") for supervised learning since they rely on manually trained data sets. In unsupervised methods (e.g., word sense induction (WSI), often referred to as the "unsupervised" version of WSD), meanings may be deduced for text using some similarity of context. Then, the new occurrences of the word may be classified into the closest induced clusters. The bottleneck in such cases is that without an already existing context, meanings are not able to be associated with words. In semantic learning, new knowledge is associated with prior knowledge. If the associations are relatively simple, the knowledge is easily remembered and/or utilized. However, this is not the case in more complex situations.

In contrast, in some embodiments, the methods and systems described herein utilize the context of synonyms (e.g., one level of synonyms) to create non-verb phases and are not based on any assumption in which occurrences may be clustered using a measure of similarity of context. Additionally, in some embodiments, the methods and systems described herein do not rely on (or utilize) previously trained datasets.

It should be understood that although embodiments herein are described with respect to and/or as being utilized on the English natural language, the methods and systems described herein may also be applicable to other natural languages (e.g., German, Spanish, French, etc.) with minor adjustments (e.g., with respect to grammar construct, tokenization, synonyms, etc.), as will be appreciated by one skilled in the art.

At least some of the aspects of functionality described herein may be performed utilizing a cognitive analysis (or machine learning technique). The cognitive analysis may include natural language processing (NLP) and/or natural language understanding (NLU) (or a NLP or NLU technique), such classifying natural language, analyzing tone, and analyzing sentiment (e.g., scanning for keywords, key phrases, etc.) with respect to, for example, content (or data), communications sent to and/or received by users, and/or other available data sources. In some embodiments, Mel-frequency cepstral coefficients (MFCCs) (e.g., for audio content detected by a microphone), and/or region-based convolutional neural network (R-CNN) pixel mapping (e.g., for images/videos), as are commonly understood, are used.

The processes described herein may utilize various information or data sources associated with users and/or content. With respect to users, the data sources may include, for example, any available data sources associated with the user. For example, in some embodiments, a profile (e.g., a cognitive profile) for the user(s) may be generated. Data sources that may be use used to generate a cognitive profile for the user(s) may include any appropriate data sources associated with the user that are accessible by the system (perhaps with the permission or authorization of the user). Examples of such data sources include, but are not limited to, communication sessions and/or the content (or communications) thereof (e.g., chatbot interactions, phone calls, video calls, text messaging, emails, in person/face-to-face conversations, etc.), a profile of (or basic information about) the user (e.g., job title, place of work, length of time at current position, family role, etc.), a schedule or calendar (i.e., the items listed thereon, time frames, etc.), projects (e.g., past, current, or future work-related projects), location (e.g., previous and/or current location and/or location relative to other users), social media activity (e.g., posts, reactions, comments, groups, etc.), browsing history (e.g., web pages visited), and online purchases.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, processing language with respect to ambiguous instances, as described herein. Utilizing the models, the performance (or operation) of the system (e.g., utilizing/based on new inputs) may be predicted and/or the performance of the system may be optimized by investigating how changes in the input(s) effect the output(s). Feedback received from (or provided by) users and/or administrators may also be utilized, which may allow for the performance of the system to further improve with continued use.

It should be understood that as used herein, the term "computing node" (or simply "node") may refer to a computing device, such as a mobile electronic device, desktop computer, etc. and/or an application, such as a chatbot, an email application, a social media application, a web browser, etc. In other words, as used herein, examples of computing nodes include, for example, computing devices such as mobile phones, tablet devices, desktop computers, or other devices, such as appliances (IoT appliances) that are owned and/or otherwise associated with individuals (or users), and/or various applications that are utilized by such computing devices.

In particular, in some embodiments, a method for analyzing language content, by a processor, is provided. An ambiguous sentence (or phrase, instance, etc.) is identified. A first word and a second word within the ambiguous sentence are selected. At least one synonym outlier for the first word and at least one synonym outlier for the second word are determined. A phrase (e.g., a noun-verb phrase) is generated utilizing the at least one synonym outlier for the first word and the at least one synonym outlier for the second word. A context for the ambiguous sentence is determined based on the generated phrase.

The generated phrase may include a selected one of the at least one synonym outlier for the first word and a selected one of the at least one synonym outlier for the second word. The determining of the context for the ambiguous sentence may include searching a database for a context in which the generated phrase is utilized.

The determining of the context for the ambiguous sentence is performed external to (i.e., without the use of) a trained dataset. The determining of the at least one synonym outlier for the first word and the at least one synonym outlier for the second word may be performed utilizing a clustering method. The clustering method may includes at least one of k-nearest neighbors (k-NN) clustering and k-means clustering.

The method may further include receiving a document. The document may be divided into a plurality of paragraphs. Each of the plurality of paragraphs may be divided into a plurality of sentences. The ambiguous sentence may be identified from the plurality of sentences.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
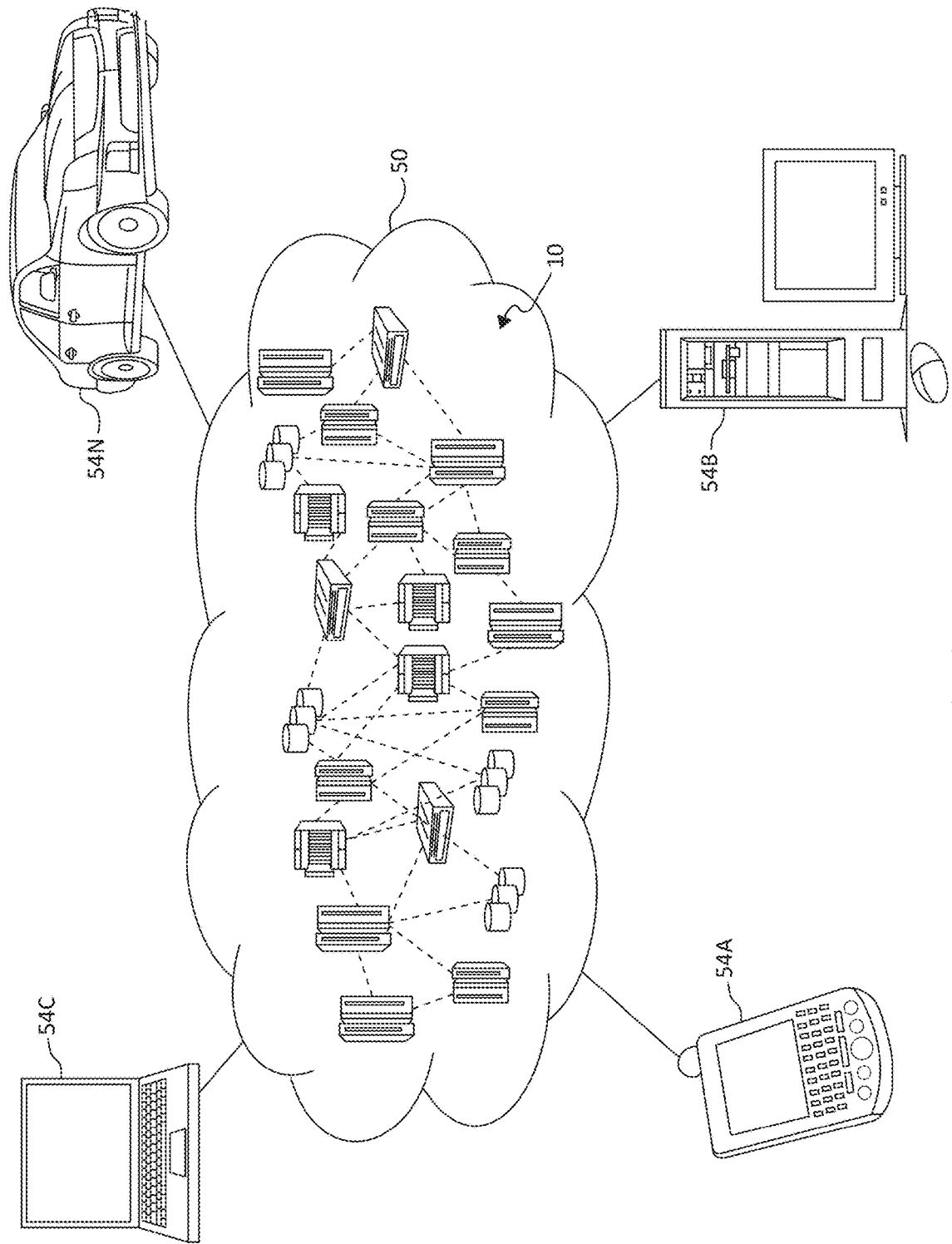
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
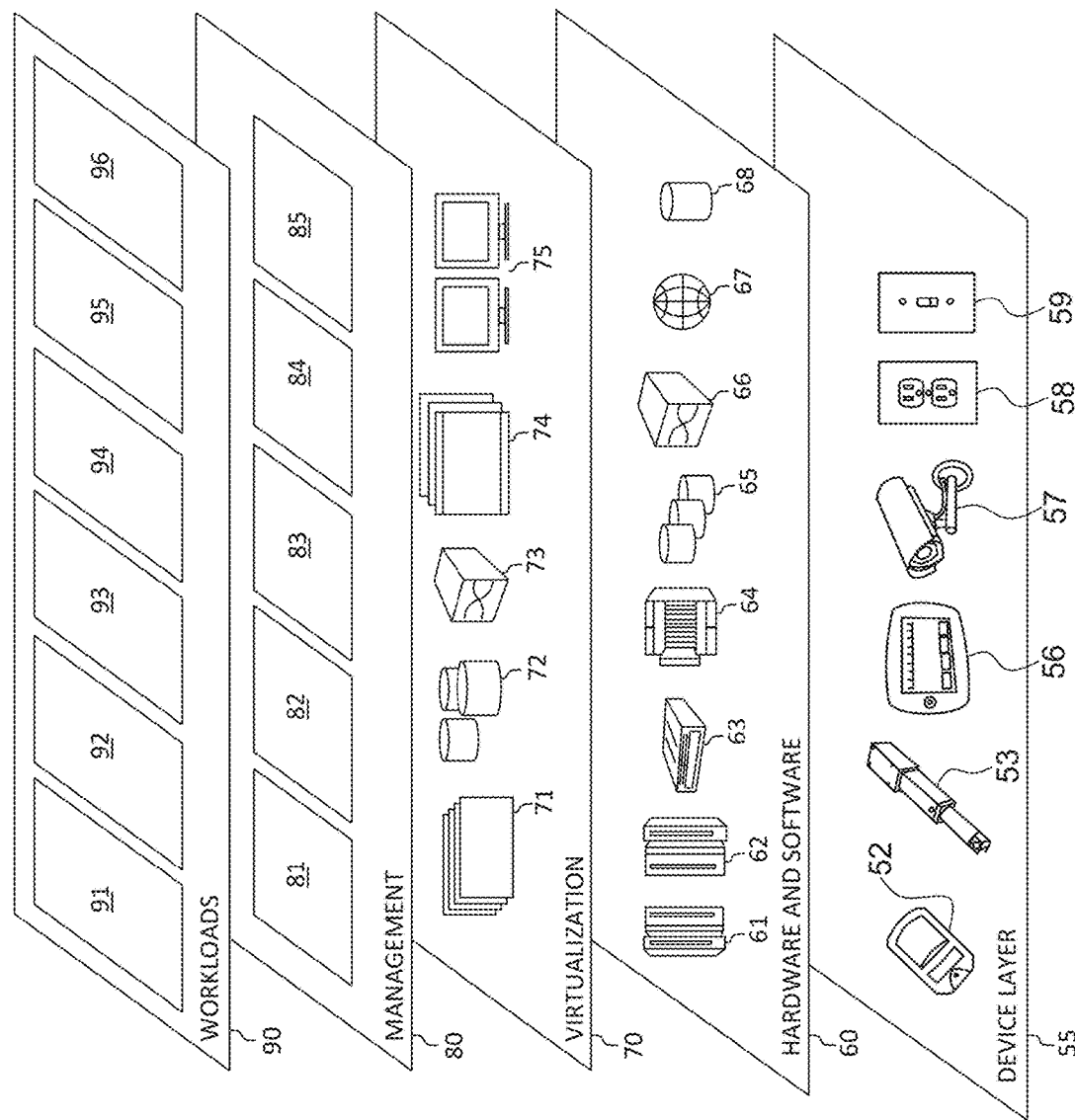
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for processing language with respect to ambiguous instances, as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments, methods and/or systems are provided that, for example identify how to apply domain specific rules to given constructs of natural language content (e.g., in the English natural language). That is, the methods and systems described herein are useful when analyzing content with one or more words that may have different meanings in different contexts. In some embodiments, the methods (and/or systems) propose the most appropriate synonym(s) for ambiguous words (or phrases, etc.) across all appropriate contexts and selects (or generates) one or more context for the content and/or ambiguous words.

Figure 4:
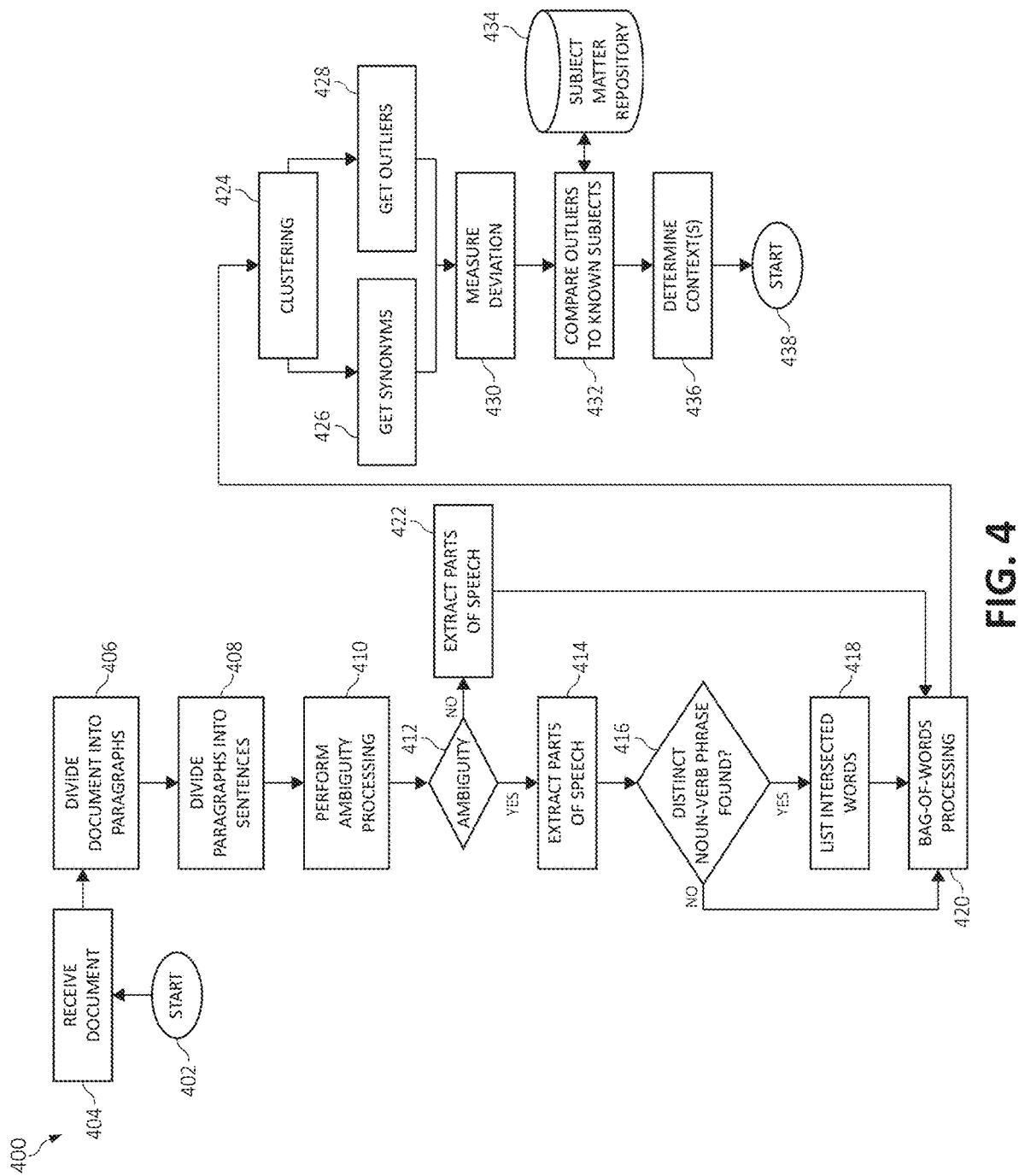
FIG. 4 is a block diagram of a method and/or system for processing language according to an embodiment of the present invention.

FIG. 4 illustrates an exemplary method (and/or system) 400 for processing (and/or analyzing) language (e.g., with respect to ambiguous instances, sentences, phrases, etc.) according to some embodiments described herein. It should be understood that the method 400 shown in FIG. 4 is merely intended as an example of the functionality described herein, as other embodiments may include different steps/processes (i.e., more or fewer steps/processes), which may be performed in different orders.

The method 400 begins at block 402 with, for example, a document(s) that includes natural language content being created and/or selected for processing. The document may include any type of suitable document, such as a financial document, legal document, technical manual, research and development report, etc., which may be any suitable form (e.g., word processing document, web page, unstructured document, etc.). At block 404, the document is received (or identified, received, etc.) by, for example, a computing system performing the functionality described herein (e.g., the systems described above).

At block 406, the document is divided into paragraphs, and at block 408, the paragraphs are divided into sentences (or phrases, etc.). In other words, at blocks 406 and 408, the document may be tokenized into sentences, as is commonly understood. At block 410, the sentence(s) is then analyzed to determine whether or not it is ambiguous or includes any ambiguous words (or terms, etc.). It should be understood that the remainder of the method 400 may be performed with respect to each of the tokenized sentences. As will be appreciated by one skilled in the art, the determination of ambiguity (e.g., with respect to NLP, NLU, etc.) may be based on whether or not different meanings or interpretations may be identified based on the context (e.g., a word/sentence/phase may have a first meaning in a first context/domain, a second meaning in a second context/domain, etc.). At block 412, if the sentence is determined to be ambiguous, at block 414 parts of speech are extracted (or determined, identified, etc.) for each of the words within the sentence, as will be appreciated by one skilled in the art.

At block 416, the ambiguous works are analyzed to determine if they include (or may be linked to form) any distinct noun-verb phrases. In some embodiments, distinct noun-verb phrases may be considered to be combinations of one or more noun phrase and one or more verb phrase that when appearing in conjunction may be utilized to arrive at the "subject" of the sentence(s).

If any distinct noun-verb phrases are identified, at block 418, the intersected (or intersecting) words (i.e., within the identified noun-verb phrase(s)) are listed. In some embodiments, the "intersected" words may refer to words that may be used as (or considered) both nouns and verbs which provide information about and/or a description of the subject. Then, in the example shown, at block 420, bag-of-words processing is performed to, for example, to convert the text into a form suitable for a machine learning algorithm (and/or cognitive analysis). If no distinct noun-verb phrases are identified, the process performed at block 418 is bypassed as shown. Additionally, returning to block 412, if the sentence is determined to not be ambiguous, at block 422, the parts of speech are extracted, and the method 400 proceeds directly to block 420.

At block 424, a clustering method (or technique) is then applied to learn about the distribution of the data. In some embodiments, a k-nearest neighbors (k-NN) algorithm (or method) is utilized. However, as other examples, k-means clustering may also be utilized, as may Word2vec models, as are commonly understood. As shown, the clustering method produces synonyms or synonym list (block 426) and outliers or an outlier list (block 428). The synonym list may include the "closest" matches for the tokenized sentence.

In the depicted embodiment, at block 430, the deviation between the synonyms and the outliers is measured. In some embodiments, the deviation is measured utilizing, for example, word vectors, as is commonly understood. In some embodiments, outliers that fall below a predetermined threshold (e.g., with respect to similarity to each of the synonyms and/or the mean value of the synonyms) are selected to be compared to a subject matter repository (as described below). As an example, the threshold may be 40% (or any other suitable threshold).

At block 432, the outliers (e.g., the selected outliers) are compared to known subjects, contexts, etc. within a subject matter repository (or database) 434. In other words, the subject matter repository is searched for subjects, contexts, etc. in which the outliers (and/or a noun-verb phrase including the outliers) are (commonly) used. In other words, different combinations of the outliers (and/or synonyms) are then combined to determine if any unique or distinct noun-verb phrases may be formed (e.g., unique or distinct within one or more subject domains). From this, at block 436, the context(s) for the sentence (and/or ambiguous words) is determined and/or stored (perhaps in combination with a signal representative thereof being generated). The method 400 ends at block 438 with, for example, the generated data (e.g., the determined context(s)) being utilized for further processing (e.g., for NLP, NLU, etc.).

Figure 5:
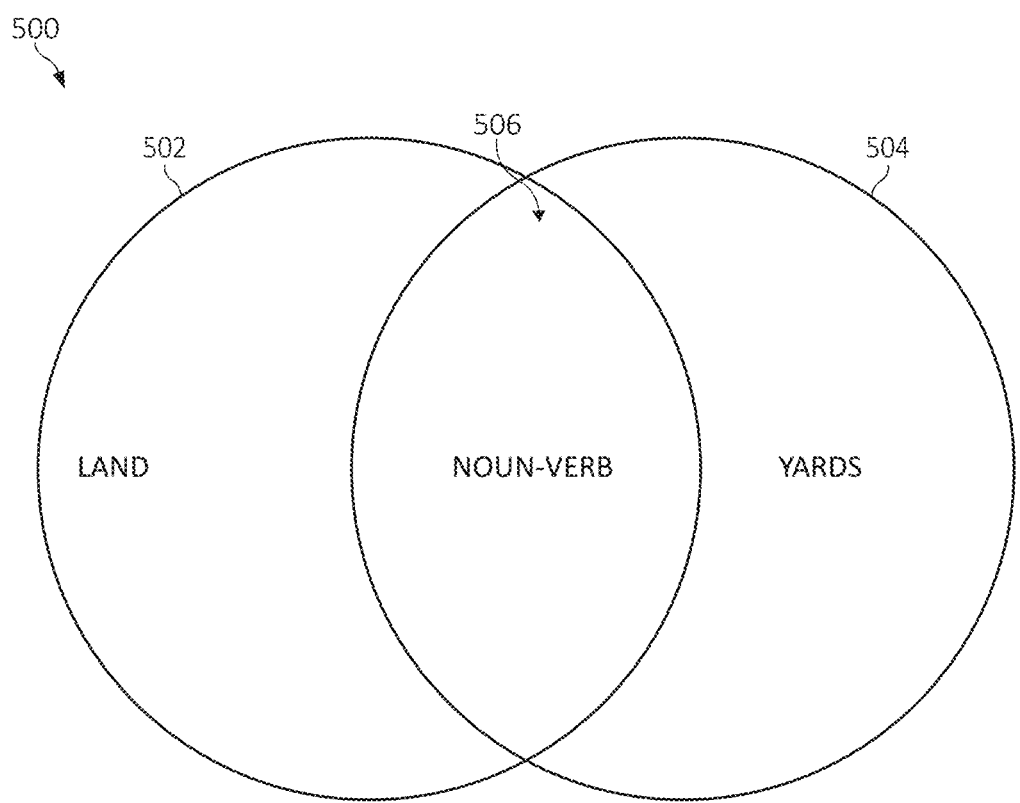
FIG. 5 is a simplified diagram representing processing non-ambiguous natural language according to an embodiment of the present invention.

As one example of a group of sentences (and/or paragraphs) to which the methods and systems described herein may be applied, consider a first sentence, "I bought a land of 10 yards," and a second sentence, "I did a deal for 10 yards." Utilizing the Venn diagram-like approach described above, the processing of the first sentence may be represented by the Venn diagram 500 shown in FIG. 5. As shown, the Venn diagram includes a first circle (or group) 502 including (and/or associated with) the word "land" and a second circle 504 including the word "yards." As indicated in FIG. 5, there is no ambiguity in the first sentence, and there are noun-verb phrases within the overlapping (or intersecting) portion(s) 506 of circle 502 and 504. When the subject matter repository is searched for words "land" and "yards," it may be determined that the context of "yards" is within the real estate domain. In other words, in the first sentence, the word "yards" refers to the general English language meaning (i.e., a unit of measurement, in this case, associated with a purchase of land).

Figure 6:
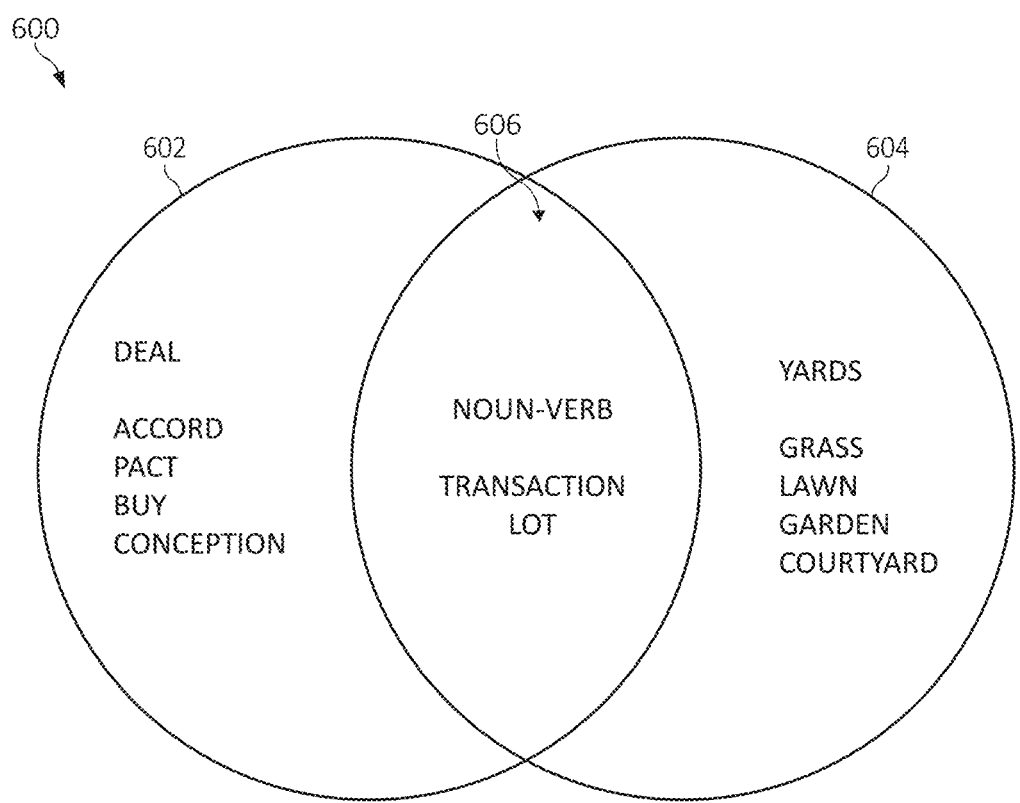
FIG. 6 is a simplified diagram representing processing ambiguous natural language according to an embodiment of the present invention.

However, in the second sentence, the word "yard" may have multiple meanings, perhaps including the general English language meaning. Referring now to FIG. 6, another Venn diagram 600 is shown, which represents the processing of the second sentence utilizing the methods and systems described herein. In the second sentence, the word "deal" may be detected as appearing in relatively close proximity to the word "yards," and may be considered to form a noun-verb phrase. As such, in some embodiments, synonyms may be determined for both "deal" and "yards." In the example shown, the Venn diagram includes a first circle 602 including the word "deal" along with multiple synonyms for the word "deal" (e.g., "accord," "pact," "buy," etc.) and a second circle 604 including the word "yards" along with multiple synonyms for the word "yards" (e.g., "grass," "lawn," "garden," etc.).

Still referring to FIG. 6, after the parts of speech for the words are extracted, and any noun-verb phrases are identified, any distinct noun-verb phrases may be identified or listed. In the example shown, a distinct noun-verb phrase may include the words "transaction" (i.e., a synonym or outlier for "deal") and "lot" (i.e., a synonym or outlier for yards). The noun-verb phrase(s) may be formed (if possible) by, for example, identifying a word from each group that may be considered both a noun and a verb. That is, the noun-verb phrase(s) may be formed by words that are determined to be in the "overlapping" or "intersecting" portions of the Venn diagram circles 602 and 604.

More particularly, with respect to the example associated with FIG. 6, in the original sentence, the word "deal" may be considered a noun and the word "yards" may be considered both a noun and a verb. Because of the ambiguity of the terms (e.g., at least regarding "yards"), a resulting noun-verb phrase does not allow the subject and/or context to be identified. As such, the outliers (and/or synonyms) are utilized to generate additional noun-verb phrases. In some embodiments, the methods and/or systems described herein discard (or ignore) words (or noun-verb phrases) that do not "fit" the original noun-verb phrase.

For example, with respect to some of the synonyms (or outliers) shown in FIG. 6, although combinations such as "accord-grass" and "pact-courtyard" utilize synonyms of the original words (i.e., "deal" and "yards" respectively), the result does not convey the subject or context of the sentence. However, the noun-verb phrase including (or utilizing) "transaction-lot" indicates that the context is related to the financial domain (e.g., which may be determined by searching the subject matter repository for subjects, contexts, etc. in which "transaction" and "lot" occur in conjunction). More particularly, in this particular example (i.e., the second sentence), a "transaction" is an agreement between a buyer and a seller to exchange a goods or service for money (or equivalent), and "yards" is a term used in the financial world that refers to one billion units) (i.e., as derived from the appearance of "lot" in that domain). As such, it is evident that in the second sentence, context is the financial domain, and the sentence is referring to a forex transaction. After such a context is determined, the meanings (or definitions) of the words may be verified within the particular domain (e.g., using any suitable database, such as a website).

In other words, noun-verb phrases provide actions associated with a subject, which facilitates the derivation of context from the actions. If more than one meaning arises during such an evaluation, the Venn diagram-like approach described herein is utilized to determine the context (or select one or more possible context).

Figure 7:
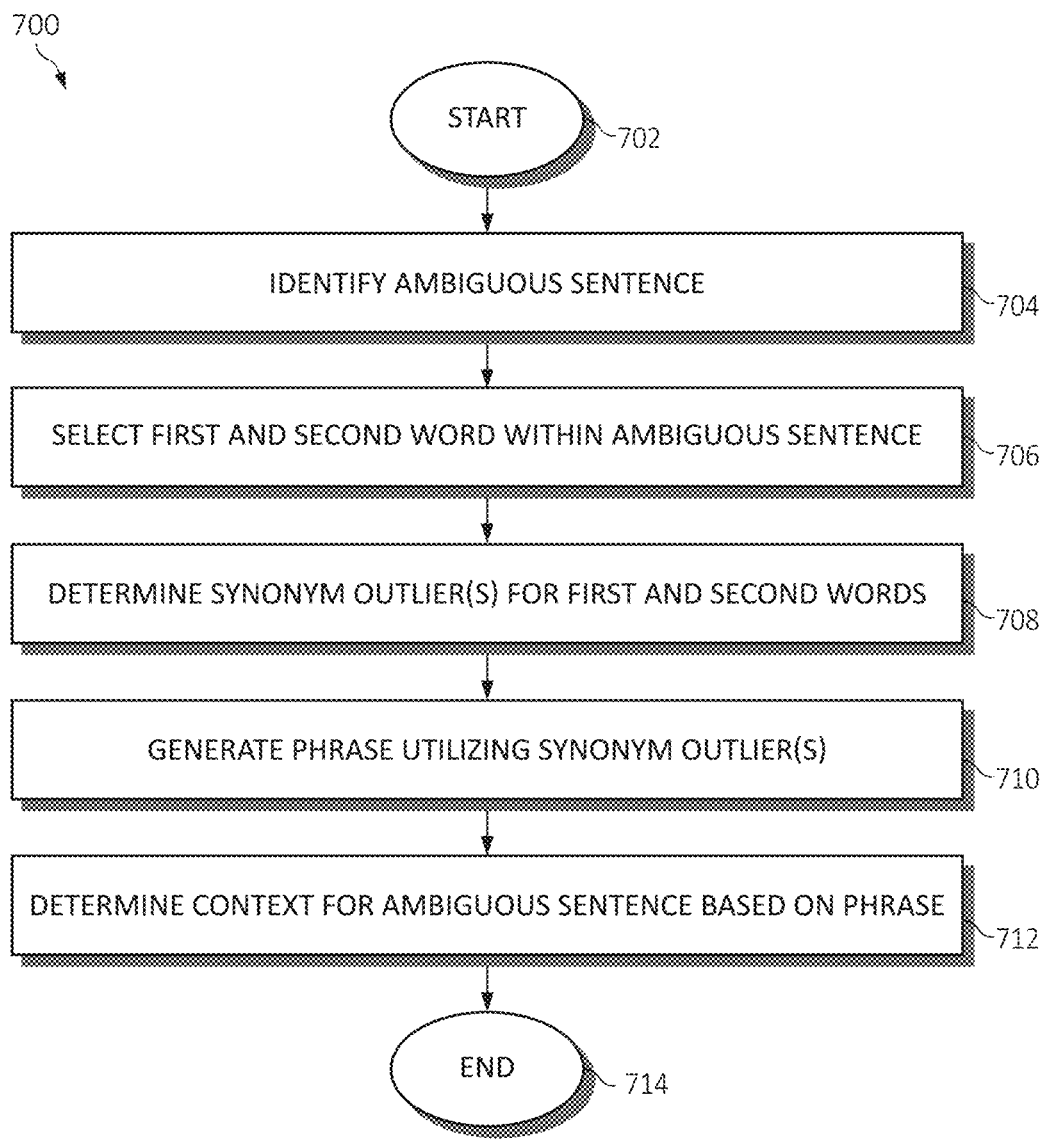
FIG. 7 is a flowchart diagram of an exemplary method for analyzing language content according to an embodiment of the present invention.

Turning to FIG. 7, a flowchart diagram of an exemplary method 700 for analyzing (and/or processing) language content (e.g., with respect to ambiguous instances) is provided. The method 700 begins (step 702) with, for example, a document(s) that includes natural language content being created and/or selected for processing. The document(s) may include any type of suitable document, such as a financial document, legal document, technical manual, research and development report, etc., which may be any suitable form (e.g., word processing document, web page, unstructured document, etc.). The document may also be received (or identified, received, etc.) by, for example, a computing system performing the functionality described herein (e.g., the systems described above).

An ambiguous sentence (or phrase, instance, etc.) is identified (step 704). As will be appreciated by one skilled in the art, the determination of ambiguity (e.g., with respect to NLP, NLU, etc.) may be based on whether or not a sentence may have different meanings or interpretations based on the context (e.g., one or more word(s) within the sentence, phrase, etc. may have one meaning in a first context/domain and another meaning in a second context/domain). Each sentence of the received document may be checked for ambiguity. This process may include dividing the document into paragraphs, and dividing each of the paragraphs into sentences. In other words, the document may be tokenized into sentences.

A first word and a second word within the ambiguous sentence are selected (step 706). The selection of the first and second word may be based on, for example, whether or not the words are ambiguous and/or if one of the words in associated with an ambiguous word (e.g., a verb/predicate associated with an ambiguous noun or vice versa, such as via a noun phrase, verb phrase, and/or noun-verb phrase).

At least one synonym outlier (or synonym) for the first word and at least one synonym for the second word are determined (step 708). The determining of the at least one synonym outlier (or synonym) for the first word and the at least one synonym outlier for the second word may be performed utilizing a clustering method. The clustering method may include, for example, k-nearest neighbors (k-NN) clustering and k-means clustering.

A phrase (e.g., a noun-verb phrase) is generated utilizing the at least one synonym outlier for the first word and the at least one synonym outlier for the second word (step 710). The generated phrase may include a selected one of the at least one synonym outlier for the first word and a selected one of the at least one synonym outlier for the second word.

A context (or one or more context) for the ambiguous sentence is determined based on the generated phrase (step 712). The determining of the context for the ambiguous sentence may include searching a database for a context(s) (or domain(s), subject(s), etc.) in which the generated phrase (and/or the combination of the selected synonyms outliers/synonyms) is utilized. That is, the database may be search for contexts in which the words of the generated phrase are used in conjunction. The determining of the context for the ambiguous sentence is performed external to (i.e., without the use of) a trained dataset.

Method 700 ends (step 714) with, for example, the determined context(s) of the ambiguous sentence being utilized for further processing (e.g., in a NLP or NLU technique). In some embodiments, feedback from users may (also) be utilized to improve the performance of the system over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for analyzing language content, by a processor, comprising:

identifying an ambiguous sentence by determining the sentence includes at least one word having a first meaning under a first context and a second, different meaning under a second context;

selecting a first word and a second word within the ambiguous sentence;

determining at least one synonym outlier for the first word and at least one synonym outlier for the second word;

analyzing different combinations of the at least one synonym outlier for the first word and the at least one synonym outlier for the second word to determine whether any of the different combinations produce a distinct noun-verb phrase, wherein the distinct noun-verb phrase includes one or more noun phrases and one or more verb phrases;

generating the distinct noun-verb phrase utilizing the at least one synonym outlier for the first word and the at least one synonym outlier for the second word; and determining a context for the ambiguous sentence based on the generated distinct noun-verb phrase by performing a search of a subject matter repository to identify any common and overlapping subjects in which the one or more noun phrases and the one or more verb phrases are used, and determining the context based on the common subjects, wherein the context is determined for the ambiguous sentence notwithstanding whether the ambiguous sentence consists of formulaic language of an idiom or pun.

2. The method of claim 1, wherein the generated distinct noun-verb phrase includes a selected one of the at least one synonym outlier for the first word and a selected one of the at least one synonym outlier for the second word.

3. The method of claim 1, wherein the determining of the context for the ambiguous sentence includes searching a database for a context in which the generated distinct noun-verb phrase is utilized.

4. The method of claim 1, wherein the determining of the context for the ambiguous sentence is performed external to a trained dataset.

5. The method of claim 1, wherein the determining of the at least one synonym outlier for the first word and the at least one synonym outlier for the second word is performed utilizing a clustering method.

6. The method of claim 5, wherein the clustering method includes at least one of k-nearest neighbors (k-NN) clustering and k-means clustering.

7. The method of claim 1, further comprising:
receiving a document;
dividing the document into a plurality of paragraphs; and
dividing each of the plurality of paragraphs into a plurality of sentences,
wherein the ambiguous sentence is identified from the plurality of sentences.

8. A system for analyzing language content comprising:
a processor executing instructions stored in a memory device, wherein the processor:
identifies an ambiguous sentence by determining the sentence includes at least one word having a first meaning under a first context and a second, different meaning under a second context;
selects a first word and a second word within the ambiguous sentence;
determines at least one synonym outlier for the first word and at least one synonym outlier for the second word;
analyzes different combinations of the at least one synonym outlier for the first word and the at least one synonym outlier for the second word to determine whether any of the different combinations produce a distinct noun-verb phrase, wherein the distinct noun-verb phrase includes one or more noun phrases and one or more verb phrases;

generates the distinct noun-verb phrase utilizing the at least one synonym outlier for the first word and the at least one synonym outlier for the second word; and determines a context for the ambiguous sentence based on the generated distinct noun-verb phrase by performing a search of a subject matter repository to identify any common and overlapping subjects in which the one or more noun phrases and the one or more verb phrases are used, and determining the context based on the common subjects, wherein the context is determined for the ambiguous sentence notwithstanding whether the ambiguous sentence consists of formulaic language of an idiom or pun.

9. The system of claim 8, wherein the generated distinct noun-verb phrase includes a selected one of the at least one synonym outlier for the first word and a selected one of the at least one synonym outlier for the second word.

10. The system of claim 8, wherein the determining of the context for the ambiguous sentence includes searching a database for a context in which the generated distinct noun-verb phrase is utilized.

11. The system of claim 8, wherein the determining of the context for the ambiguous sentence is performed external to a trained dataset.

12. The system of claim 8, wherein the determining of the at least one synonym outlier for the first word and the at least one synonym outlier for the second word is performed utilizing a clustering method.

13. The system of claim 12, wherein the clustering method includes at least one of k-nearest neighbors (k-NN) clustering and k-means clustering.

14. The system of claim 8, wherein the processor further:
receives a document;
divides the document into a plurality of paragraphs; and
divides each of the plurality of paragraphs into a plurality of sentences,
wherein the ambiguous sentence is identified from the plurality of sentences.

15. A computer program product for analyzing language content, by a processor, the computer program product embodied on a non-transitory computer-readable storage medium having computer-readable program code portions stored therein, the computer-readable program code portions comprising:
an executable portion that identifies an ambiguous sentence by determining the sentence includes at least one word having a first meaning under a first context and a second, different meaning under a second context;
an executable portion that selects a first word and a second word within the ambiguous sentence;
an executable portion that determines at least one synonym outlier for the first word and at least one synonym outlier for the second word;
an executable portion that analyzes different combinations of the at least one synonym outlier for the first word and the at least one synonym outlier for the second word to determine whether any of the different combinations produce a distinct noun-verb phrase, wherein the distinct noun-verb phrase includes one or more noun phrases and one or more verb phrases;
an executable portion that generates the distinct noun-verb phrase utilizing the at least one synonym outlier for the first word and the at least one synonym outlier for the second word; and
an executable portion that determines a context for the ambiguous sentence based on the generated distinct noun-verb phrase by performing a search of a subject matter repository to identify any common and overlapping subjects in which the one or more noun phrases and the one or more verb phrases are used, and determining the context based on the common subjects, wherein the context is determined for the ambiguous sentence notwithstanding whether the ambiguous sentence consists of formulaic language of an idiom or pun.

16. The computer program product of claim 15, wherein the generated distinct noun-verb phrase includes a selected one of the at least one synonym outlier for the first word and a selected one of the at least one synonym outlier for the second word.

17. The computer program product of claim 15, wherein the determining of the context for the ambiguous sentence includes searching a database for a context in which the generated distinct noun-verb phrase is utilized.

18. The computer program product of claim 15, wherein the determining of the context for the ambiguous sentence is performed external to a trained dataset.

19. The computer program product of claim 15, wherein the determining of the at least one synonym outlier for the first word and the at least one synonym outlier for the second word is performed utilizing a clustering method.

20. The computer program product of claim 19, wherein the clustering method includes at least one of k-nearest neighbors (k-NN) clustering and k-means clustering.

21. The computer program product of claim 15, wherein the computer-readable program code portions further include:
an executable portion that receives a document;
an executable portion that divides the document into a plurality of paragraphs; and
an executable portion that divides each of the plurality of paragraphs into a plurality of sentences,
wherein the ambiguous sentence is identified from the plurality of sentences.

\* \* \* \* \*